United States Patent [19]

Arakawa

[11] Patent Number: 4,656,698

[45] Date of Patent: Apr. 14, 1987

[54] ARRANGEMENT FOR GRIPPING END REGIONS OF ELONGATED FLEXIBLE ELEMENTS

[75] Inventor: Hideo Arakawa, Tokyo, Japan

[73] Assignee: Arakawa & Co., Ltd., Japan

[21] Appl. No.: 796,423

[22] Filed: Nov. 8, 1985

[30] Foreign Application Priority Data

Nov. 8, 1984 [JP] Japan ............................ 59-168554[U]
Nov. 9, 1984 [JP] Japan ............................ 59-169178[U]

[51] Int. Cl.[4] ........................ F16G 11/00; B65H 59/14
[52] U.S. Cl. ............................... 24/136 A; 24/136 R; 24/115 L
[58] Field of Search ............. 24/136 A, 136 R, 115 L; 248/246, 225.4

[56] References Cited

U.S. PATENT DOCUMENTS

| | | | |
|---|---|---|---|
| 700,412 | 5/1902 | Fischer ................................ | 24/136 A |
| 1,606,873 | 11/1926 | Gamache et al. ................. | 24/136 A |
| 1,829,760 | 11/1931 | Santiago ............................. | 24/136 A |
| 2,062,628 | 12/1936 | Yannetta ............................ | 24/136 A |
| 2,514,760 | 7/1950 | Hanson et al. .................... | 24/136 A |
| 3,335,469 | 8/1967 | Shand et al. ....................... | 24/115 L |
| 4,067,403 | 1/1978 | Richmond et al. ................ | 24/136 A |
| 4,278,224 | 7/1981 | Arakawa ............................ | 248/246 |
| 4,392,555 | 7/1983 | Ellis ................................... | 24/115 L |

FOREIGN PATENT DOCUMENTS

| | | | |
|---|---|---|---|
| 1782 | of 1913 | United Kingdom ............. | 24/136 A |
| 276525 | 9/1927 | United Kingdom ............. | 24/136 A |

Primary Examiner—Victor N. Sakran
Attorney, Agent, or Firm—Steinberg & Raskin

[57] ABSTRACT

An arrangement for gripping end regions of an elongated flexible element extended between support surfaces, comprises a casing having an interior passage, and an inner conically-shaped wall, and a movable sleeve mounted for axial movement relative to the casing. The sleeve has an axial channel through which the element is inserted, an outer conically-shaped body, and at least one radial hole in the outer body. At least one gripping member is mounted in the radial hole of the sleeve. The radial dimension of the gripping member is larger than the radial length of the radial hole. The gripping member is movable from a non-gripping position in which the gripping member is located outside the channel, to a gripping portion in which the gripping member is pushed by the inner wall to extend into the channel for gripping the inserted end region of the element.

16 Claims, 14 Drawing Figures

FIG. 7
FIG. 8
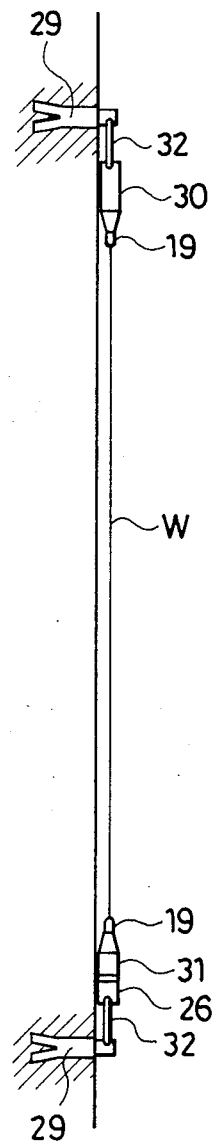
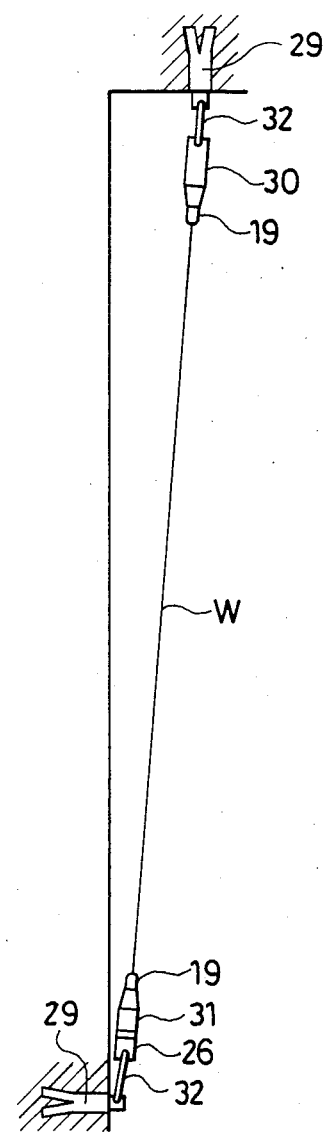

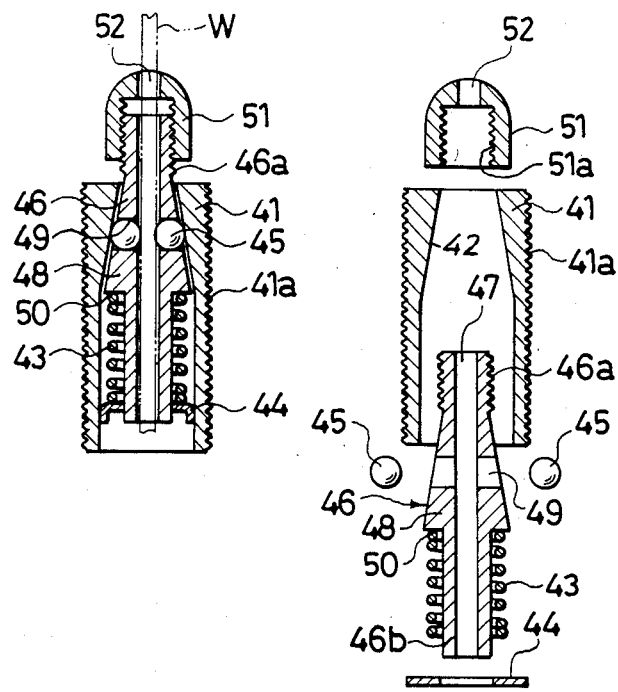
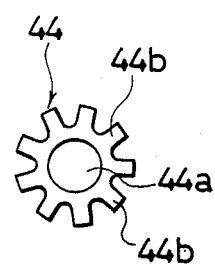
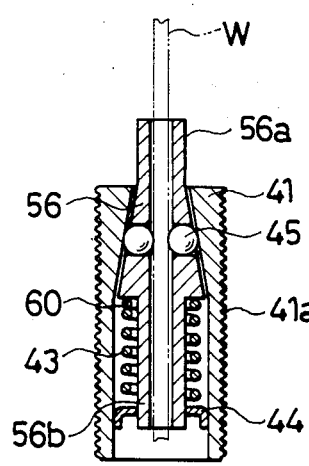
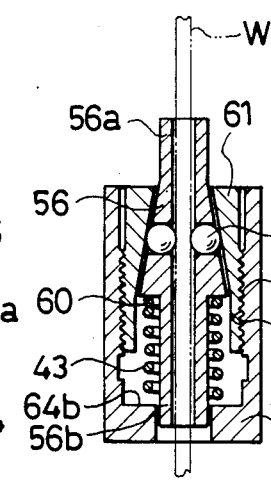
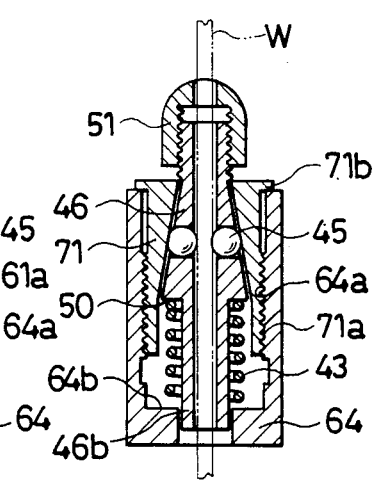

ARRANGEMENT FOR GRIPPING END REGIONS OF ELONGATED FLEXIBLE ELEMENTS

BACKGROUND OF THE INVENTION

1. Field of the Invention

The present invention generally relates to an arrangement for gripping an end region of an elongated flexible element and, more particularly, to a wire gripper for gripping the ends of a wire of the type generally used for supporting objects, such as framed pictures, lights and display articles, on or from support surfaces, such as counters, store windows, walls, floors or ceilings of a house or of an exhibit hall. Still more particularly, this invention permits a desired length of wire to be gripped, as well as tensioning the wire to any desired extent.

2. Description of the Prior Art

In the conventional case of hanging a picture on a wall, a pair of hooks or brackets having holes are mounted at spaced-apart locations on the wall, and a wire is generally strung between the hooks or brackets. Although generally satisfactory for their intended purpose, the conventional wire-hanging techniques are time-consuming and awkward to perform. It was somewhat difficult to mount and demount the wire from hooks or brackets and, furthermore, it was difficult to adjust the length and the tension of the wire properly. Also, experience has shown that the wire often became slack or detached from the hooks or brackets over time, which, of course, is disadvantageous.

SUMMARY OF THE INVENTION

1. Objects of the Invention

Accordingly, it is an object of the present invention to provide an arrangement for gripping the end regions of elongated flexible elements such as wires, ropes, cords, strings, etc., which arrangement is free from the aforementioned inconveniences and disadvantages.

Another object of this invention is to provide such a gripping arrangement which is quick and simple to operate and which will reliably grip the end regions of the elements.

Still another object of this invention is to provide such a gripping arrangement which has a minimal number of parts, which is reliable in operation, and which is inexpensive to manufacture.

2. Features of the Invention

In keeping with these objects, and others which will become apparent hereinafter, one feature of this invention resides, briefly stated, in an arrangement for gripping an end region of an elongated flexible element such as a wire comprising a casing bounding an interior passage which extends axially along a longitudinal axis of the casing. The casing has an inner circumferential wall which is tapered in axial direction. The arrangement also comprises a sleeve mounted, at least in part, in the interior passage for axial movement relative to the casing. The sleeve has an outer circumferential wall which is tapered in axial direction, and which slidably engages the inner circumferential wall of the casing during movement of the sleeve. The sleeve also has an interior axially-extending channel in which the end region of the element is inserted. The sleeve further has a radial bore which extends radially from the outer wall of the sleeve for a predetermined radial distance to the channel.

The arrangement further comprises a gripping member, e.g., a ball, mounted, at least in part, in the radial bore for radial movement therealong. The gripping member has a radial dimension larger than said predetermined radial distance of the radial bore. In accordance with this invention, the sleeve and the gripping member are moved by moving means between a non-gripping position in which the ball is located outside the channel, to a gripping position in which the ball extends, at least in part, into the channel for gripping the inserted end region of the element.

It is advantageous if the sleeve is provided with an extension portion which extends outwardly and past the casing. The exposed extension portion enables a user to push the extension portion and, hence, the sleeve, to the non-gripping position in order to adjust the length and tension of the element to be gripped.

The above-described arrangement is easy to operate and can reliably and quickly grip the inserted flexible element.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIGS. 5-8 show various configurations of two gripping arrangements of the type shown in FIG. 4, as used on various types of support surfaces;

FIG. 9 is a longitudinal cross-sectional view of a fifth embodiment of a gripping arrangement according to the present invention;

FIG. 10 is an exploded view of the embodiment of FIG. 9;

FIG. 11 is a top view of a spring stop member shown in FIGS. 9 and 10;

FIG. 12 is longitudinal cross-sectional view of a sixth embodiment of a gripping arrangement according to the present invention;

FIG. 13 is a longitudinal cross-sectional view of a seventh embodiment of a gripping arrangement according to the present invention; and FIG. 14 is a longitudinal cross-sectional view of an eighth embodiment of a gripping arrangement according to the present invention.

DETAILED DESCRIPTION OF THE PREFERRED EMBODIMENTS

Figure 1:
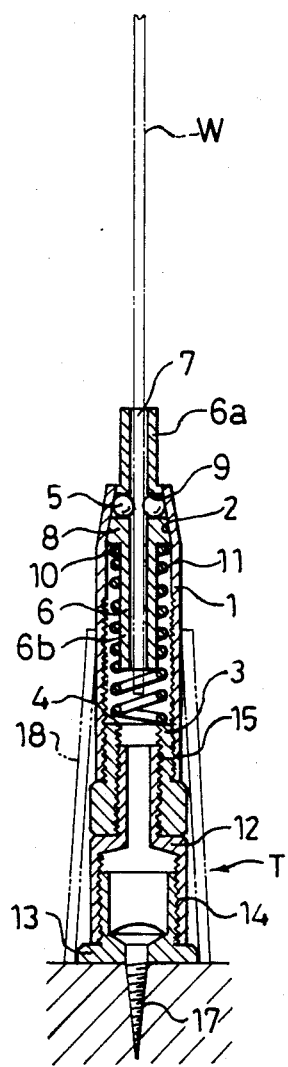
FIG. 1 is a longitudinal cross-sectional view of a first embodiment of a gripping arrangement according to the present invention.

Referring now to the drawings, wherein similar or corresponding components are designated by like reference numerals throughout the different figures, there is shown in FIG. 1 a first embodiment of a gripping arrangement or wire gripper according to the present invention.

In FIG. 1, the wire gripper comprises a casing 1 having a hollow, cylindrical, tubular form, and having a longitudinal axis of symmetry which runs lengthwise along the casing. The casing has an annular side wall bounding an axially-extending interior passage. One end of the casing has an inner circumferential wall 2 which is tapered in axial direction to form a frusto-conically-shaped end. The diameter of the circumferential wall 2 is gradually reduced in size. The opposite end of the casing 1 is internally threaded and threadedly engages an exterior thread provided on a support member or cylindrical adaptor 3. An upper axial end surface 4 of the adaptor 3 is situated within the passage of the casing and acts as a spring abutment surface, as described below. An adhesive may be applied to the threaded interconnection of the casing 1 and the adaptor 3 in order to stationarily mount the latter to the casing.

A movable sleeve 6 holding at least one gripping member or ball 5 is mounted for axial movement relative to the casing 1. The movable sleeve 6 has a generally frusto-conically-shaped body portion 8 having an outer circumferential wall which is tapered in axial direction and which slidably engages the inner wall 2 during movement of the sleeve. The sleeve 6 also has an interior axially-extending channel 7 in which an end region of an elongated flexible element W is inserted. The element W may be a wire, a rope, a line, a cord, a string or the like. The sleeve 6 has at least one radial bore 9 in the conical body portion 8, in which bore the ball 5 is movably arranged. The bore 9 extends radially from the outer wall of the body portion for a predetermined radial distance to the channel.

The ball 5 functions as a gripping member for the element W. The radial dimension of the gripping member, i.e., the diameter of the ball 5, is larger than the predetermined radial distance of the radial bore 9. The sleeve 6 and the ball 5 are moved between a non-gripping position in which the ball 5 is located outside the channel, to a gripping position in which the ball extends, at least in part, into the channel for gripping the inserted end region of the element. As described below, the tapered inner wall 2 pushes the ball 5 further and further into the channel as the body portion 8 rises through the passage. Two, three or more balls 5 arranged in corresponding additional radial bores 9 may be used to provide even more gripping action. It is particularly desirable if all the balls and bores are equiangularly arranged about the longitudinal axis to obtain a uniform force distribution about the element.

The sleeve 6 is provided with an upper cylindrical projection or extension portion 6a which projects upwardly beyond and past the upper end of the casing 1, and with a lower cylindrical portion 6b of reduced diameter. The upper projection 6a is integral with the upper end of the body portion 8, and the cylindrical lower portion 6b is integral with the lower end of the body portion 8. The diameter of the cylindrical lower portion 6b is smaller than that of the lower end of the body portion 8 to form a shoulder 10 therebetween.

A tensioned coil spring 11 is arranged between the spring abutment surface 4 of the adaptor 3 and the shoulder 10 of the sleeve 6. The tensioned coil spring 11 constantly and normally urges the sleeve 6 upwards such that the body portion 8 is axially moved further and further into conical inner wall 2. At the same time, the ball 5 is pushed radially further and further by the inner wall 2 toward and into the channel.

A cylindrical nipple or turnbuckle member 12 has an upper portion provided with an exterior thread which threadedly engages at 15 an inner thread of the adaptor 3. A cylindrical mount or mounting member 13 has an upper portion provided with an exterior thread which threadedly engages at 14 an inner thread of a lower portion of the nipple 12. The lower portion of the nipple 12 is provided with a knurling on its periphery to facilitate manual turning of the nipple 12. The threads at 14 which couple the nipple 12 and the mount 13, and the threads at 15 which couple the adaptor 3 and the nipple 12, are reversely formed, e.g., have right- and left-hand threads, respectively, so that the adaptor 3, the nipple 12 and the mount 13 constitute a turnbuckle mechanism T. When the nipple 12 is turned in one direction, the adaptor 3 and the mount 13 move toward each other, and vice versa. The mount 13 has a lower opening through which a screw 17 extends for mounting the arrangement on a wall, a floor, a ceiling, or other support surface. A tubular, frusto-conical cover 18 protects the turnbuckle mechanism and the lower half of the arrangement from accidental contact or tampering.

Figure 2:
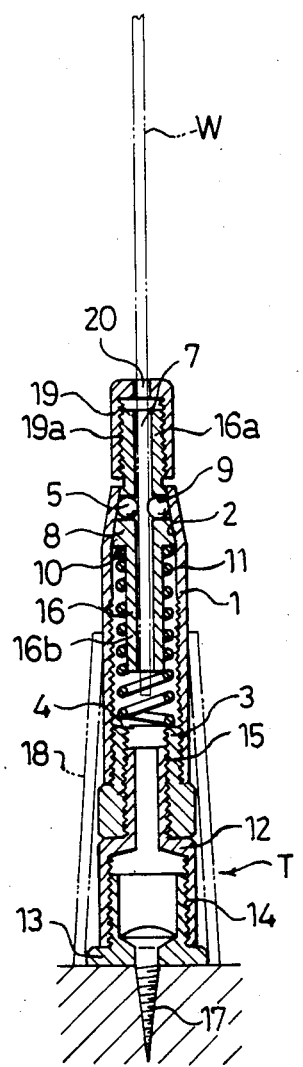
FIG. 2 is a longitudinal cross-sectional view of a second embodiment of a gripping arrangement according to the present invention.
Figure 4:
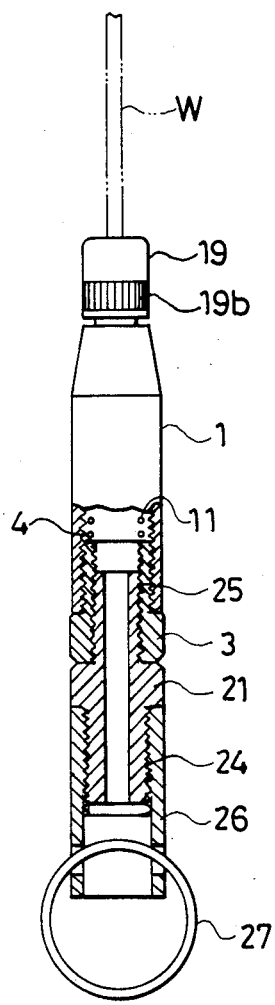
FIG. 4 is a longitudinal cross-sectional view of a fourth embodiment of a gripping arrangement according to the present invention.

FIG. 2 shows a second embodiment of the wire gripper, which has almost the same construction as the one shown in FIG. 1, except that a movable sleeve 16 having an upper projection 16a and a cylindrical lower portion 16b is provided with an exterior thread on the periphery of the upper projection 16a, and a stopper or cap 19 of a cylindrical form, having an axial bore 20 and an inner thread on its inner wall, is threadedly engaged at 19a with the exterior thread of the upper projection 16a of the sleeve 16. The cap 19 can be positioned at any selected position along the projection 16a so that the axial end face of the cap is positionable at any desired distance from the casing. The position of the cap end face determines the extent to which the sleeve is movable. The cap 19 is provided with a milling 19b on its periphery, as shown in FIG. 4.

The element W may be extended between any two support surfaces, e.g., the floor and the ceiling, by using the wire gripper as follows:

Assuming that the upper end of the element W in FIG. 1 or 2 is secured to the ceiling, and that the lower free end of the element W hangs down, to secure the free end of the element to the floor, the mount 13 is initially mounted to the floor by the screw 17, and then the casing 1 together with the adaptor 3 is attached to the mount 13 via the nipple 12. At this point, the threaded connections at 14 and 15 are half engaged.

Then, the free end of the element W is inserted into the bore 7 of the sleeve 16 and, in the case of the FIG. 2 embodiment, through the bore 20 of the cap 19. The projection 6a is then manually pushed down against the force of the spring and, in the case of the FIG. 2 embodiment, if the cap 19 is, for example, engaged about half-way along the upper projection 16a of the sleeve 16, the cap 19 is then manually pushed down. The inserted element, when it engages the balls 5, pushes them radially outwardly, thereby permitting the element to be inserted past the balls and through the lower end of the sleeve. The projection or cap is now released, thereby enabling the spring 11 to return the sleeve to its original position, whereupon the balls are pushed radially outwardly by the inner wall 2 to the gripping position wherein the balls clampingly engage the element. The cap 19 may now be threaded down the rest of the way so that its lower end face engages the sleeve 16. This insures that the sleeve cannot be accidentally moved. The tension of the element W is adjusted to a proper strength by turning the turnbuckle member 12. Lastly, the cover 18, which initially was above the casing 1, is pushed down to rest against the floor, thereby completing the extension of the element W.

If the tension of the element W is lessened during use, then the cover 18 may be raised, and the element W is tensioned again by turning the turnbuckle member 12 or, if necessary, by partially unthreading the cap 19 from the sleeve 16, inserting the element W further into the bore 7 of the sleeve 16, re-threading the cap 19 back into engagement with the casing, and thereafter re-tightening the turnbuckle member 12.

If it is desired to remove the element W from the wire gripper, then the cap 19 is fully or sufficiently unthreaded from the sleeve 16, and then the upper projection 16a of the sleeve 16 is pushed down against the force of the spring 11. This releases the balls 5, and then the element W may be pulled out from the bore 7.

Figure 3:
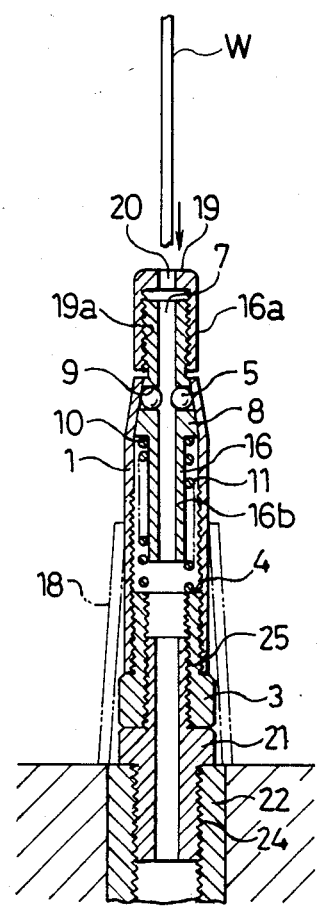
FIG. 3 is a longitudinal cross-sectional view of a third embodiment of a gripping arrangement according to the present invention.

FIG. 3 shows a third embodiment of the wire gripper, which has a very similar construction to that of the second embodiment shown in FIG. 2, except that a tubular turnbuckle member 21 having an upper threaded portion and a lower threaded portion is engaged with the adaptor 3 on its upper portion at 25, and with an interior thread of an anchor 22 on its lower portion at 24, the anchor 22 being embedded in the wall or like support surface. The threaded connection 24 coupling the turnbuckle member 21 and the anchor 22, on the one hand, and the threaded connection 25 coupling the adaptor 3 and the turnbuckle member 21, on the other hand, are reversely threaded so that the adaptor 3, the turnbuckle member 21 and the anchor 22 constitute a turnbuckle mechanism T which operates in the same manner as previously described.

FIG. 4 shows a fourth embodiment of the wire gripper, which has almost the same structure as the third embodiment of FIG. 3, except that the lower threaded portion of the turnbuckle member 21 threadedly engages an inner thread at 24 of a mount 26 having a coupling ring 27 in its free end. A variety of hooks and openable rings can be used instead of the coupling ring 27.

Figure 5:
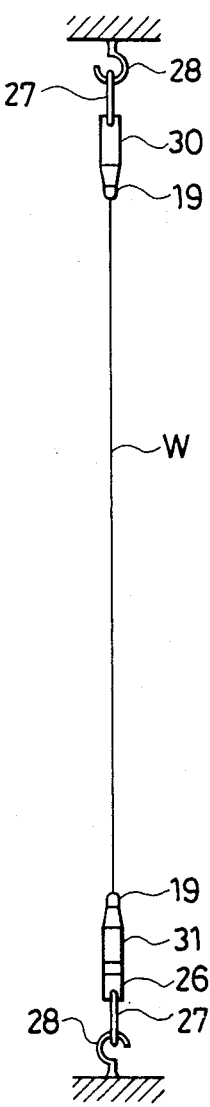
Figure 6:
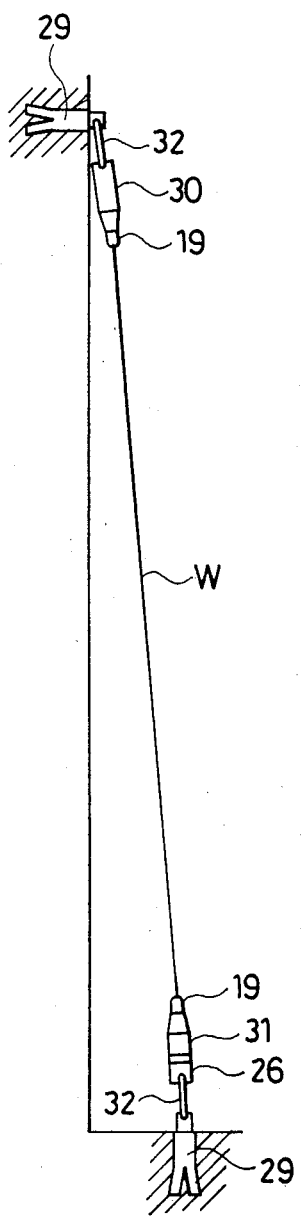

In FIGS. 5–7, there are shown various uses of the wire grippers of the present invention. In FIG. 5, the element W is extended between the ceiling and the floor by using wire grippers 30 and 31 having coupling rings 27 which engage hooks 28 mounted to the ceiling and the floor. In this case, the upper wire gripper 30 has no turnbuckle mechanism and the ring 27 is coupled to the free end of the turnbuckle member. The lower wire gripper 31 is provided with the turnbuckle mechanism, as shown in FIG. 4.

In FIGS. 6–8, the element W is extended between anchor bolts 29 embedded in the walls, the ceiling and the floor by using the wire grippers 30 and 31 via hooks 32, instead of the rings 27, in the same manner as the example shown in FIG. 5.

FIGS. 9 and 10 show a fifth embodiment of the wire gripper, which has an analogous construction to that of the wire gripper shown in FIG. 2. In the drawings, a cylindrical casing 41 corresponding to the casing 1 of FIG. 2 is provided with an inner, tapered, conical wall 42 in its upper end portion. The outer periphery of the casing 41 has an exterior thread 41a. A coil spring 43 corresponds to the spring 11 of FIG. 2. A spring abutment member 44 is press-fitted into the interior passage of the casing 41 from its initially-open lower end to supportably engage the lower end of the spring 43. As shown in FIG. 11, the spring abutment member 44 is made of a metallic or a plastic material, and is provided with a central hole 44a and a plurality of radially-extending arms 44b equiangularly arranged relative to one another. The diameter of the abutment member 44 is larger than that of the passage of the casing 41, and the arms 44b, having a certain flexibility or resiliency, can be bent or deformed when the abutment member 44 is inserted into the passage of the casing 41. Balls 45 correspond to the balls 5 of FIG. 2.

A movable sleeve 46 having the same structure as that of the sleeve 16 of FIG. 2 is provided with an axial channel 47, an outer conically-shaped body portion 48, radial holes 49 and a shoulder 50. The sleeve 46 is also provided with a threaded upper projection 46a and a cylindrical lower reduced-diameter portion 46b. A cap 51 has an axial bore 52, and an inner thread 51a which threadedly engages the threaded upper projection 46a of the sleeve 46.

FIG. 12 shows a sixth embodiment of the wire gripper, having the same construction as the one shown in FIG. 9, except that a movable sleeve 56 having the same structure as the sleeve 16 shown in FIG. 2 is not provided with an exterior thread on its upper projection 56a. The sleeve 56 is provided with a cylindrical lower portion 56b and a shoulder 60 in the same manner as the sleeve 46 of FIG. 9.

FIG. 13 shows a seventh embodiment of the wire gripper, having a similar construction to the one shown in FIG. 12. In this embodiment, a casing 61 is somewhat shorter in its lower end portion than the casing 41 of FIG. 9, and is provided with an exterior thread 61a on its lower end portion. A spring abutment member 64 having a cylindrical form is provided with an axial bore, an interior thread 64a which threadedly engages the exterior thread 61a of the casing 61, and an abutment surface 64b on its inner lower end, which functions as a support for the lower end of the coil spring 43. The lower bore of the spring abutment member 64 is larger than the diameter of the lower portion 56b of the sleeve 56. The lower end of the lower portion 56b is inserted in the lower bore of the spring abutment member 64.

FIG. 14 shows an eighth embodiment of the wire gripper, having a similar construction to the wire grippers of FIGS. 9 and 13. In this embodiment, a casing 71 is provided with an exterior thread 71a in the same manner as the one shown in FIG. 13, and with a flange 71b which extends radially from its upper end and contacts the upper end of the spring abutment member 64. The movable sleeve 46 shown in FIG. 9 is arranged in the casing 71 in the same manner as that of FIG. 9.

In the preferred embodiments described above, the casing, the sleeve, the balls and the adaptor may be made of a metallic or a synthetic resin material, as occasion demands, in a conventional manner.

It is readily understood from the above description that a wire, rope, line, cord, string, etc. can be mounted readily, quickly and securely to any desired position on a wall, ceiling or floor by using the wire grippers according to the present invention. The extended element can be tensioned to any desired degree, and locked in position. According to the present invention, the wire gripper is of a simple construction, and can be produced at a low cost.

It will be understood that each of the elements described above, or two or more together, also may find a useful application in other types of constructions differing from the types described above.

While the invention has been illustrated and described as embodied in an arrangement for gripping end regions of elongated flexible elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for gripping an end region of an elongated flexible element, comprising:
   (a) a casing bounding an interior passage which extends axially along a longitudinal axis of said casing, said casing having an inner circumferential wall which is tapered in an axial direction;
   (b) a sleeve mounted at least in part in said interior passage for axial movement relative to said casing, said sleeve having an outer circumferential wall which is tapered in the axial direction and slidably engages said inner circumferential wall of said casing during movement of said sleeve, said sleeve further having an interior axially-extending channel in which the end region of the element is inserted, said sleeve also having a radial bore which extends radially from said outer wall of said sleeve for a predetermined radial distance to said channel;
   (c) a gripping member mounted at least in part in said radial bore for radial movement therealong, said gripping member having a radial dimension larger than said predetermined radial distance of said radial bore; and
   (d) means for moving said sleeve and said gripping member between a non-gripping position in which said gripping member is located outside said channel, to a gripping position in which said gripping member extends at least in part into said channel for gripping the inserted end region of the element;
   wherein said sleeve has a generally conically-shaped body portion bounded by said outer circumferential wall, an extension portion extending axially of said body portion at one end thereof outwardly and past said casing, and a reduced-diameter portion extending axially of said body portion at the opposite end thereof into said casing;
   wherein said moving means include biasing means for normally urging said sleeve to the gripping position;
   wherein said moving means include a support member mounted on said casing and having an abutment surface within said passage, and wherein said biasing means constitute an elongated spring having one end engaged with said abutment surface, an opposite end engaged with said body portion, and a coiled portion surrounding said reduced diameter portion;
   wherein said support member has an exterior thread which threadedly engages an interior thread formed within said passage, and further comprising a mounting member securely mounted to a support surface, said mounting member having an exterior thread, wherein said moving means further include a turnbuckle member having an interior thread which threadedly engages said exterior thread of said mounting member, and an exterior thread which threadedly engages an interior thread of said support member; and wherein said exterior and interior threads of said turnbuckle member extend in opposite circumferential directions such that turning of said turnbuckle member causes relative movement between said mounting and support members.

2. The arrangement as recited in claim 1, wherein said sleeve has an axially-extending portion extending outwardly and past said casing to enable the extension portion to be pushed at least in part into said casing and move the sleeve and said gripping member to the non-gripping position.

3. The arrangement as recited in claim 1, wherein said sleeve has an axially-extending extension portion having an exterior thread extending outwardly and past said casing; and further comprising a cap having an interior thread which threadedly engages said exterior thread of the extension portion, said cap having an end face adjustably positionable relative to the casing to enable the cap to be pushed until the end face engages the casing for moving the sleeve and said gripping member to the non-gripping position.

4. The arrangement as recited in claim 1, and further comprising at least one additional radial bore and gripping member, said gripping members being arranged at opposite sides of the inserted end region of the element and equiangularly relative to one another.

5. The arrangement as recited in claim 4, wherein each gripping member is ball-shaped.

6. The arrangement as recited in claim 1, wherein said mounting member is mounted on said support surface by threaded fasteners.

7. The arrangement as recited in claim 1, wherein said mounting member is mounted on said support surface by anchors.

8. The arrangement as recited in claim 1, wherein said mounting member includes a hook.

9. The arrangement as recited in claim 1, wherein said mounting member includes a mounting ring.

10. The arrangement as recited in claim 1, wherein said casing has an exterior thread; and further comprising a housing having an interior thread which threadedly engages said exterior thread of the casing.

11. The arrangement as recited in claim 10, wherein said housing has an interior partition wall extending in part across said passage.

12. The arrangement as recited in claim 10, wherein said casing has a flange engageable with said housing.

13. An arrangement for gripping an end region of an elongated flexible element, comprising:
   (a) a casing bounding an interior passage which extends axially along a longitudinal axis of said casing, said casing having an inner circumferential wall which is tapered in an axial direction;
   (b) a sleeve mounted at least in part in said interior passage for axial movement relative to said casing, said sleeve having an outer circumferential wall which is tapered in the axial direction and slidably engages said inner circumferential wall of said casing during movement of said sleeve, said sleeve further having an interior axially-extending channel in which the end region of the element is inserted, said sleeve also having a radial bore which extends radially from said outer wall of said sleeve for a predetermined radial distance to said channel;

(c) a gripping member mounted at least in part in said radial bore for radial movement therealong, said gripping member having a radial dimension larger than said predetermined radial distance of said radial bore; and (d) means for moving said sleeve and said gripping member between a non-gripping position in which said gripping member is located outside said channel, to a gripping position in which said gripping member extends at least in part into said channel for gripping the inserted end region of the element;

wherein said sleeve has a generally conically-shaped body portion bounded by said outer circumferential wall, an extension portion extending axially of said body portion at one end thereof outwardly and past said casing, and a reduced-diameter portion extending axially of said body portion at the opposite end thereof into said casing;

wherein said moving means include biasing means for normally urging said sleeve to the gripping position;

wherein said moving means include a support member mounted on said casing and having an abutment surface within said passage, and wherein said biasing means constitute an elongated spring having one end engaged with said abutment surface, an opposite end engaged with said body portion, and a coiled portion surrounding said reduced-diameter portion;

and further comprising a mounting member securely mounted to a support surface, said mounting member having an exterior thread, and wherein said moving means further include a turnbuckle member having an interior thread which threadedly engages said exterior thread of said mounting member, and an exterior thread which threadedly engages an interior thread of said support member; and wherein said exterior and interior threads of said turnbuckle member extend in opposite circumferential directions such that turning of said turnbuckle member causes relative movement between said mounting and support members.

14. The arrangement as recited in claim 13, wherein said support member is threadedly mounted on said casing.

15. The arrangement as recited in claim 13, wherein said support member is snap-fitted in said casing.

16. The arrangement as recited in claim 1, wherein said casing has a tubular shape, and wherein the inner circumferential wall of said casing has a generally conical shape.

* * * * *